US009608498B2

(12) United States Patent
Alekseev et al.

(10) Patent No.: US 9,608,498 B2
(45) Date of Patent: Mar. 28, 2017

(54) METHOD AND DEVICE FOR GENERATING ELECTRICAL ENERGY

(71) Applicant: LINDE AKTIENGESELLSCHAFT, München (DE)

(72) Inventors: Alexander Alekseev, Wolfratshausen (DE); Christoph Stiller, Fürstenfeldbruck (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/770,836

(22) PCT Filed: Mar. 21, 2014

(86) PCT No.: PCT/EP2014/000776
§ 371 (c)(1),
(2) Date: Aug. 27, 2015

(87) PCT Pub. No.: WO2014/146796
PCT Pub. Date: Sep. 25, 2014

(65) Prior Publication Data
US 2016/0013702 A1    Jan. 14, 2016

(30) Foreign Application Priority Data
Mar. 21, 2013  (EP) .................................... 13001453

(51) Int. Cl.
H02K 7/18      (2006.01)
F01K 23/18     (2006.01)
(Continued)

(52) U.S. Cl.
CPC ........... *H02K 7/1823* (2013.01); *F01K 23/10* (2013.01); *F01K 23/18* (2013.01); *F01K 27/00* (2013.01);
(Continued)

(58) Field of Classification Search
CPC .. H02K 7/1823; F02C 3/04; F02C 6/16; F25J 1/0203; F25J 1/0228; F25J 1/0045;
(Continued)

(56) References Cited

U.S. PATENT DOCUMENTS 5,495,709 A     3/1996  Frutschi
2003/0101728 A1  6/2003  Wakana et al.
(Continued)

FOREIGN PATENT DOCUMENTS

JP    S58176407 A   10/1983
JP    H04132837 A    5/1992

*Primary Examiner* — Viet Nguyen
(74) *Attorney, Agent, or Firm* — David A. Hey, Esq.

(57) ABSTRACT

A method and device for generating electrical energy in a combined system of power plant, cold storage system and air compression system. The air compression system has a primary air compressor for generating a primary compressed air flow at a first pressure level. The power plant has a combustion unit which operates at a second pressure level and generates a combustion gas from which electrical energy is generated. The cold storage system has means for generating cold from compressed air, means for storing cold thus produced and means for generating a compressed air flow at the second pressure level using the stored cold. In a first operating mode (charging mode), a first compressed air flow is introduced from the air compression system into the cold storage system to charge the cold reservoir. In a second operating mode (discharging mode), the first compressed air flow generated in the primary air compressor, is introduced into the cold storage system to discharge the cold reservoir and to generate a third compressed air flow at the second pressure level, which is introduced into the combustion unit. The air compression system has a first booster for boosting compressed air compressed in the primary air compressor to the second pressure level. In a third operating mode (normal mode), the entire primary compressed air flow generated in (Continued)

the primary air compressor is boosted in the first booster to the second compressed air level and introduced into the combustion unit.

10 Claims, 10 Drawing Sheets (51) Int. Cl.
*F02C 3/04* (2006.01)
*F25J 1/00* (2006.01)
*F25J 1/02* (2006.01)
*F01K 23/10* (2006.01)
*F01K 27/00* (2006.01)
*F02C 6/16* (2006.01)

(52) U.S. Cl.
CPC .............. *F02C 3/04* (2013.01); *F02C 6/16* (2013.01); *F25J 1/004* (2013.01); *F25J 1/0012* (2013.01); *F25J 1/0037* (2013.01); *F25J 1/0045* (2013.01); *F25J 1/0202* (2013.01); *F25J 1/0203* (2013.01); *F25J 1/0228* (2013.01); *F25J 1/0251* (2013.01); *F25J 1/0264* (2013.01); *F05D 2220/31* (2013.01); *F05D 2220/32* (2013.01); *F05D 2240/35* (2013.01); *F25J 2205/24* (2013.01); *F25J 2210/06* (2013.01); *F25J 2235/02* (2013.01); *F25J 2240/82* (2013.01); *F25J 2240/90* (2013.01); *Y02E 60/15* (2013.01)

(58) Field of Classification Search
CPC  F25J 1/0037; F25J 1/0202; F25J 1/004; F25J 1/0264; F25J 1/0012; F25J 1/0251; F01K 23/18; F01K 27/00; F01K 23/10

USPC ........................................................... 290/2
See application file for complete search history.

(56) References Cited

U.S. PATENT DOCUMENTS

| | | | |
|---|---|---|---|
| 2005/0132746 A1* | 6/2005 | Brugerolle ............. | F25J 1/0012 62/615 |
| 2006/0078034 A1* | 4/2006 | Coffinberry ............... | F02C 1/00 372/109 |
| 2007/0163261 A1* | 7/2007 | Strathman ............... | F01K 23/00 60/651 |
| 2009/0282840 A1* | 11/2009 | Chen et al. ........... | F01D 15/005 62/50.3 |
| 2009/0293503 A1* | 12/2009 | Vandor ................. | F01D 15/005 62/45.1 |
| 2010/0176602 A1* | 7/2010 | Shinnar .................... | F03G 6/04 290/1 A |
| 2010/0251712 A1* | 10/2010 | Nakhamkin ............... | F01K 3/12 60/659 |
| 2012/0056482 A1* | 3/2012 | Kaufman ................. | F25J 1/0012 307/80 |
| 2012/0255312 A1* | 10/2012 | Rajaraman .............. | F01K 21/04 62/6 |
| 2013/0147197 A1* | 6/2013 | Goebel ....................... | F01K 3/12 290/52 |
| 2014/0217739 A1* | 8/2014 | Morgan .................. | F01D 15/10 290/54 |
| 2014/0245756 A1* | 9/2014 | Morgan .................... | F02C 1/04 62/50.1 |

\* cited by examiner

METHOD AND DEVICE FOR GENERATING ELECTRICAL ENERGY

The invention relates to a method for generating electrical energy in a combined system comprising power plant, cold storage system and air compression system. The air compression system has a primary air compressor for generating a primary compressed air flow at a first pressure level. The power plant has a combustion unit which generates a combustion gas from which electrical energy is generated. The cold storage system has means for generating cold from compressed air, means for storing cold produced in the process and means for generating a compressed air flow at a second pressure level with the aid of the stored cold, wherein the second pressure level is higher than the first pressure level. When operating in a first operating mode (charging operation), a first compressed air flow from the air compression system is led into the cold storage system in order to charge the cold reservoir. When operating in a second operating mode (discharging operation), the cold reservoir is discharged and a third compressed air flow is generated here, which is led into the combustion unit. When operating in a third operating mode (normal operation), the whole of the primary compressed air flow generated in the primary air compressor is led into the combustion unit. The invention is characterized in that the combustion unit is operated at the second pressure level and the air compression system additionally has a first booster for boosting compressed air compressed in the primary air compressor to the second pressure level. In addition, in the third operating mode (normal operation), the whole of the primary compressed air flow generated in the primary air compressor is boosted to the second compressed air level in the first booster before being led into the combustion unit. Further, in the second operating mode (discharging operation), a first compressed air flow that is formed by at least part of the primary compressed air flow generated in the primary air compressor is led into the cold storage system in order to discharge the cold reservoir, and therefore to generate the third compressed air flow at the second pressure level, which is led into the combustion unit. Moreover, the means for generating a compressed air flow at the second pressure level in the cold storage system have a cold compressor for boosting at least part of the first compressed air flow.

The "primary air compressor" can be dedicated or, in addition to the quantity of air here called the "primary compressed air flow" for the combustion unit and the cold storage system, can generate still further proportions of air for other users. These further proportions of air can be relatively small (for example instrument air) or, conversely, can also be very large; the primary air compressor is then part of a larger, integrated air compression system. As a rule, the air compression system to which the primary air compressor belongs is primarily used to supply the combustion unit and the cold storage system. Here, in any case, "the primary compressed air flow, which is compressed in the primary air compressor to the first compressed air level" is to be understood to mean the sum of the proportions of air compressed in the primary air compressor, which are ultimately led into the combustion unit or into the cold storage system.

The primary air compressor can have one or more stages connected in series and be constructed with one or more streams. Primary air compressor and booster can have a common drive or be driven by separate shafts.

The term "pressure level" is used here in order to be able to ignore unavoidable and unintended pressure differences, such as for example the natural pressure losses of the apparatus through which flow passes. A pressure level comprises, for example, a pressure range of +/−1 bar. The second pressure level can be equal to, lower or higher than the first pressure level. As a rule, it is at least 5 bar, preferably more than 8 bar, higher than the first pressure level.

The cold generation, storage and recovery can be carried out by any suitable method in the invention. Within the cold storage system, means for generating cold from compressed air (cold generation) and the means for generating a compressed air flow at the second pressure level (cold recovery) can be formed by separate apparatus; preferably, however, at least to some extent the same apparatus is used for cold generation and recovery. The cold storage can be carried out in any known way, for example in the form of a cold or cryogenic fluid or in the form of a solid cold reservoir, for example a regenerator. Within the context of the cold generation, a storage fluid can be cooled down merely by the change of sensible heat or else can be formed by liquefaction of a gas. Within the context of the invention, combinations of all possibilities for the cold generation, storage and recovery are also possible.

Not covered by the term "cold storage system" are systems which are used for another primary purpose and additionally act as a cold reservoir, for example air fractionation systems, which are operated variably here as a function of the price of power and buffer liquid products.

A method of the type mentioned at the beginning and a corresponding device are known from U.S. 2003101728 A1. Here, the primary air compressor is operated only in normal operation and in charging operation; the outlet pressure of the primary air compressor here (the "first pressure level") is equal to the operating pressure of the combustion unit (the "second pressure level"). Before the start of the discharging operation, the primary air compressor is uncoupled from the drive and therefore stopped; this requires a great deal of outlay on apparatus and operating technology.

The invention is therefore based on the object of reducing the outlay on apparatus for the combined system.

This object is achieved by the combination of the features noted above describing how the invention is characterized. Here, the primary air compressor also runs in the second operating mode, the discharging operation. The complicated machine can therefore be used in all the operating phases of the combined system; other systems for the compression of combustion air can be configured to be smaller and more economical or in the best case, left out entirely.

In the invention, the heat which is needed to discharge the cold reservoir in discharging operation is at least partly introduced by air generated in the primary air compressor.

In the invention, the first and the second pressure levels are different. The "first pressure level" lies between 4 and 10 bar, preferably between 4 and 8 bar, and the "second pressure level" lies above 10 bar, preferably between 12 and 70 bar.

This pressure difference is generated in particular by a first booster for the boosting of compressed air compressed to the second pressure level in the primary air compressor. The first booster is part of the "air compression system". In normal operation, all of the air from the primary air compressor is led into the first booster.

In addition, in the invention the energy storage capacity of the system is increased by the use of at least one cold compressor, while in the known system, although a cold compressor is also used, this is used only in charging operation. This cold compressor is used in the second operating mode for at least part of the first compressed air flow in the cold storage system to be brought to the second pressure level (and in some embodiments beyond the second pressure level to a higher pressure level). To this end, use is not exclusively made of conventional warm gas compressors, of which the heat of compression is removed in a re-cooler. Within the context of the invention, a cold compressor is used for this purpose. Here, a "cold compressor" is understood to mean a gas compressor, the inlet temperature of which lies below 240 K. Of course, the cold storage system of the invention can also have two or more cold compressors.

In the second operating mode (the discharging operation), the first compressed air flow can be formed by only a first part of the primary compressed air flow generated in the primary air compressor. The remainder—or part thereof—can be led into the combustion unit directly (i.e. past the cold storage system).

For instance, within the context of the invention it is sufficient to use in the power plant a combustion turbine which is not coupled to an air compressor. Here, "combustion turbine" is understood to mean a system in which, in a way similar to in a classic gas turbine system, combustion waste gas is expanded in a turbine (expander), producing work, in order to generate electrical energy in a generator coupled to the turbine. As opposed to a classic gas turbine system comprising gas turbine combustion chamber, gas turbine expander and gas turbine compressor for compressing the combustion air, however, a "combustion turbine" is not coupled mechanically to a compressor but transfers the mechanical energy obtained completely or virtually completely to a generator for generating electrical energy. The mechanical energy generated in the combustion turbine by means of work-producing expansion of the combustion gas is therefore converted completely or substantially completely into electrical energy within the context of the efficiency of the machine.

In this particularly preferred refinement of the invention, the primary air compressor for the cold storage system also takes over completely the function of the compression of the combustion air for the power plant.

Preferably, in the cold storage system, more precisely in the means for generating cold from compressed air, at least in the first operating mode (charging operation), cold is obtained by expanding air, producing work. To this end, at least part (the "first partial flow") of the first compressed air flow is led into an air turbine. The latter drives a "second booster" for at least one part (the "second partial flow") of the first compressed air flow. The second partial flow preferably comprises the first partial flow, which means that the booster increases the inlet pressure of the air turbine and therefore the cold output generated there, without additional energy having to be introduced from outside. One or more further boosters can be provided, which are connected in parallel or series to the second booster and are likewise driven by work-producing expansion of air in an air turbine or by energy introduced from outside (for example an electric motor). For instance, the cold storage system can have two turbine-booster combinations and in addition an externally driven booster; the latter can also be constructed as a recycle compressor. In many cases, it is possible in the invention to manage without a further externally driven compressor in the first operating mode; the whole of the external energy which flows into the cold storage system then originates from the primary air compressor. One example of this is a cold storage system in which, in the first operating mode, only a single booster for air runs, being driven by an air turbine.

The cold storage system of the invention can in particular be constructed as a liquid air storage system wherein the means for generating cold from compressed air comprise an air turbine and in which, in the first operating mode, at least a first partial flow of the first compressed air flow is expanded, producing work. The air turbine is coupled mechanically to a second booster, in which, in the first operating mode, at least a second partial flow of the first compressed air flow is boosted. Here, in the second operating mode the stored liquid air is brought to a high pressure which lies at least at the second pressure level and, under this high pressure, evaporates or pseudo-evaporates. Cold storage systems of this type are known per se in the earlier European patent applications EP 2 604 824 A1, EP 2 662 552 A1, 12004833.5 and the patent applications corresponding thereto.

In the liquid air storage system, the "means for generating cold from compressed air" are formed as an air liquefier, the "means for generating a compressed air flow at the second pressure level" as an air evaporator.

In the invention, the liquid air can be stored unpressurized (that is to say at ambient pressure). Alternatively, it is stored at an increased pressure, preferably in the range from 3 to 25 bar, for example at 4, 6, 8 or 16 bar.

Within the context of the invention, the air evaporator can have an air turbine in which, in the second operating mode, at least part of the (pseudo-) evaporated air is expanded from a fourth pressure level to the second pressure level, producing work, the air turbine being coupled mechanically in particular to an electric generator or to a cold machine increasing the pressure of an air flow in the second operating mode. It is also possible in the invention for two or more air turbines to be used.

To this end, before its (pseudo-) evaporation, the liquid air is brought to a fourth pressure level, which lies at more than 42 bar, preferably more than 63 bar. An upper limit for the fourth pressure level is formed by the operating parameters of the air turbine. The air turbine can also be constructed as a hot turbine, the inlet temperature of which lies above the ambient temperature (hot gas expander).

It is also possible for a plurality of such air turbines to be provided in the air evaporator, for example one for each cold machine. Here, "cold machine" is understood to mean a machine for increasing the pressure of an air flow, the inlet temperature of which lies considerably below ambient temperature, in particular below 240 K. This can be a cold compressor for gaseous air or a pump for liquid air.

In an alternative refinement of the invention, in the first operating mode a liquid storage fluid is cooled down in the cold storage system and led into a cold tank and, in the second operating mode, liquid storage fluid is taken from the cold tank and heated up. In this case, it is expedient to store the heated liquid storage fluid in a second, warm tank. Only sensible heat is transferred to or from the storage fluid here, which means that it experiences no phase change either during cooling or during heating.

The cooling and heating of the storage fluid is carried out between two temperature levels in this case. The first, lower temperature level $T1$ can in this case lie in the range from 78 to 120 K, preferably 78 to 100 K, the second, higher temperature level $T2$ in the range from 130 to 200 K, preferably 130 to 180 K.

In a specific embodiment of this variant of the invention, a cold storage system, in which two storage fluids are used, is as described, for example, in WO2014026738 A1 and the patent applications corresponding thereto.

A further, preferred alternative uses a regenerator as cold storage device wherein in the first operating mode, a liquid storage fluid is cooled down and led into a cold tank, and in the second operating mode, liquid storage fluid is taken from the cold tank and heated up. Here, too, in the first operating mode (A), the "first compressed air flow" is not liquefied but only cooled down. This cold is not stored as cryogenic liquid air but in a solid, the storage mass of the regenerator.

The invention additionally relates to a device for generating electrical energy by using a combined system comprising power plant, cold storage system and air compression system. The air compression system has a primary air compressor for generating a primary compressed air flow at a first pressure level. The power plant has at combustion unit for generating a combustion gas and has means for generating electrical energy from the combustion gas. The cold storage system has means for generating cold from compressed air, means for storing cold produced in the process and means for generating a compressed air flow at a second pressure level with the aid of the stored cold, wherein the second pressure level is higher than the first pressure level. The device has control means to control various operating modes. In a first operating mode (charging operation), a first compressed air flow from the air compression system is led into the cold storage system in order to charge the cold reservoir. In a second operating mode (discharging operation), the cold reservoir is discharged and third compressed air flow is generated here, which is led into the combustion unit. In a third operating mode (normal operation), the whole of the primary compressed air flow generated in the primary air compressor is led into the combustion unit. The device of the invention is characterized in that the air compression system additionally has a first booster for boosting compressed air compressed in the primary air compressor to the second pressure level. Further, the control means are constructed in such a way that the combustion unit is operated at the second pressure level. Further, in the third operating mode (normal operation), the whole of the primary compressed air flow generated in the primary air compressor is led in, boosted to the second compressed air level, in the first booster before being led into the combustion unit. In addition, in the second operating mode (discharging operation), a first compressed air flow that is formed by at least part of the primary compressed air flow generated in the primary air compressor is led into the cold storage system in order to discharge the cold reservoir and therefore to generate the third compressed air flow at the second pressure level, which is led into the combustion unit. Moreover, the means for generating a compressed air flow at the second pressure level in the cold storage system, have a cold compressor for boosting at least part of the first compressed air flow. The device of the invention is further characterized in that the control means are constructed in such a way that, in the second operating mode (discharging operation), the first compressed air flow is formed only by a first part of the primary compressed air flow generated in the primary air compressor. The device according to the invention can be supplemented by device features including that in the second operating mode (discharging operation), a second part of the primary compressed air flow generated in the primary air compressor is led past the cold storage system and led into the combustion unit. Further, in the power plant, the combustion gas from the combustion unit is expanded in a combustion turbine, producing work, said combustion turbine being coupled to a generator for generating electrical energy but not to an air compressor. In addition, the means for generating cold from compressed air comprise an air turbine and in which, in the first operating mode at least first partial flow of the first compressed air flow is expanded, producing work, wherein the air turbine is coupled mechanically to a second booster, in which, in the first operating mode, at least a second partial flow of the first compressed air flow is boosted. Further the storage means of the cold storage system have a liquid air tank for cryogenic liquid air, wherein in the first operating mode, part of the first compressed air flow is liquefied in the means for generating cold from compressed air and is led into the liquid air tank, and in the second operating mode, liquid air is taken from the liquid air tank and, at above-atmospheric pressure, is evaporated or pseudo evaporated in the means for generating a compressed air flow at the second pressure level. In addition, the means for generating a compressed air flow at the second pressure level have an air turbine, in which, in the second operating mode, at least part of the (pseudo-) evaporated air is expanded from a fourth pressure level to the second pressure level, producing work, wherein, in the second operating mode, the air turbine is in particular coupled mechanically to an electric generator or to a cold machine for increasing the pressure of an air flow. Also, in the cold-storage system in the first operating mode, a liquid storage fluid is cooled down and led into a cold tank, and in the second operating mode, liquid storage fluid is taken from the cold tank and heated up. Further, the cold storage system has a regenerator, through which, in the first and in the second operating mode, at least part of the first compressed air flow flows. In addition, the second pressure level is higher than the first pressure level.

The invention and further details of the invention will be explained in more detail below by using exemplary embodiments illustrated schematically in the drawings, in which.

In the various drawings, mutually corresponding components and method steps carry the same designations. The parts of the system which are respectively not in operation are struck through. Although, in all the exemplary embodiments, no further larger air consumer is supplied by the air compression unit (which would readily be possible), the air compression unit supplies smaller quantities of air for other purposes (for example instrument air). In the drawings, however, only the "primary compressed air flow", which supplies the power plant and/or the cold storage system, is illustrated. The "first pressure level" in the exemplary embodiments lies at around 5 bar, the "second pressure level" at around 17 bar.

Figure 1:
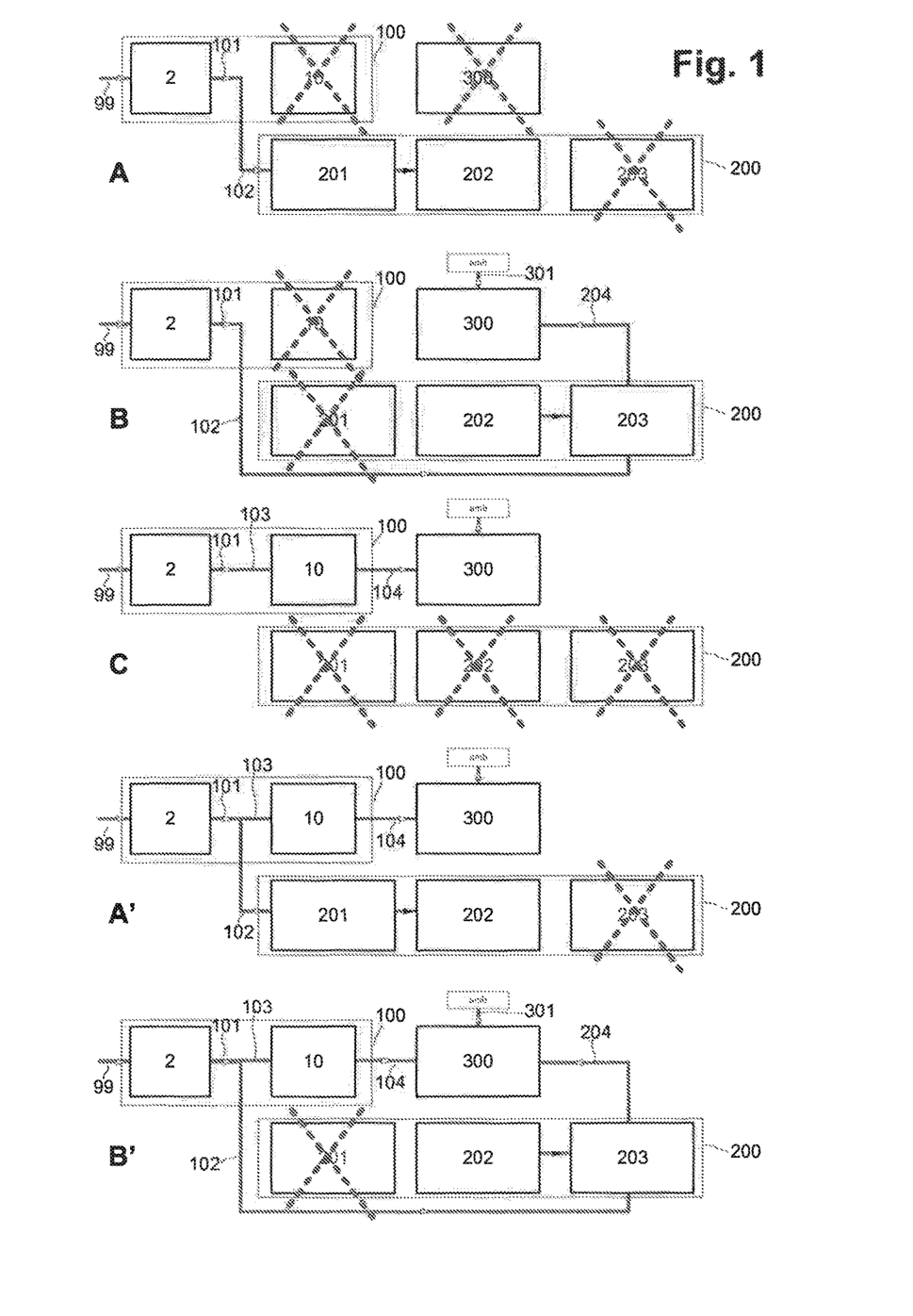
FIG. 1 shows the basic principle of the invention with at least three—here five—operating modes.

The combined system according to the invention, illustrated roughly schematically in FIG. 1, has an air compression system 100, a cold storage system 200 and a power plant 300. The air compression system 100 comprises a primary air compressor 2 and a first booster 10, the cold storage system 200 comprises means 201 for generating cold from compressed air, means 202 for storing cold produced in the process and means 203 for generating a compressed air flow at a second, higher pressure level. The power plant 300 has a combustion unit and a combustion turbine, which is connected to an electric generator (not illustrated in detail in FIG. 1).

Three operating modes are illustrated in FIG. 1;
A: a "first operating mode" (pure charging operation),
B: a "second operating mode" (pure discharging operation) and
C: a "third operating mode" (normal operation—pure energy generation)
A': a modified "first operating mode" (charging operation combined with energy generation)
B': a modified "second operating mode" (discharging operation combined with combustion air direct from the primary air compressor).

In the first operating mode A, the first booster 10, the power plant 300 and the means 203 for generating a compressed air flow are non-operational. Only the cold reservoir 202 is charged. Atmospheric air 99 is compressed to the first pressure level in the primary air compressor 2. The "primary compressed air flow" 101 is led completely as "first compressed air flow" into the means 201 for generating cold from compressed air, cold produced there being stored in the cold storage means 202.

In the second operating mode B, the first booster 10 and the means 201 for generating cold from compressed air are non-operational. Only the cold reservoir 202 is charged. Atmospheric air 99 is compressed to the first pressure level in the primary air compressor 2. The "primary compressed air flow" 101 is led completely as "first compressed air flow" into the means 203 for generating for generating a compressed air flow with the aid of the cold stored in the cold reservoir 202. The "third compressed air flow" 204 produced in the process is at the second pressure level and is led into the power plant (300) as combustion air. The combustion gas 301 that is expanded, producing work, is blown off into the atmosphere (amb), following appropriate purification, if necessary, or following the separation of carbon dioxide.

In the third operating mode C, the cold storage system 200 is completely non-operational. (Of course, the cold stored in the cold reservoir 202 is maintained, apart from natural losses; however, the cold reservoir is neither charged nor discharged in a targeted manner.) Only the power plant is operated, however the primary air compressor 2 continues to function. The entire primary compressed air flow 101, as "second compressed air flow" 103, is boosted to the second pressure level in the first booster 10 and used in the power plant 300 as combustion air 104. In this operating mode, the air flow 104 preferably constitutes the single source for combustion air of the power plant 300.

In the modified first operating mode A', only the means 203 for generating a compressed air flow are non-operational. The primary compressed air flow 101 is divided between the cold storage system 200 (first compressed air flow 102) and the power plant (second compressed air flow 103). Therefore, at the same time, the cold reservoir 202 is charged and electrical energy is generated in the power plant 300. In principle, any desired proportion of the primary compressed air flow 101 can be led into the cold storage system 200 as first compressed air flow 102. For a relatively long time, preferably 50 to 100% is led into the cold storage system. Values outside this numerical range are generally achieved only briefly during the change to normal operation C or to pure charging operation A.

In the modified second operating mode B', only the means 201 for generating cold from compressed air are non-operational. The primary compressed air flow 101 is likewise divided between the cold reservoir system 200 (first compressed air flow 102—hereafter 203) and the power plant (second compressed air flow 103). Therefore, at the same time the cold reservoir 202 is discharged and the power plant 300 is supplied with additional combustion air 104 which (apart from the boosting 10) comes directly to the primary air compressor 2. In principle, any desired proportion of the primary compressed air flow 101 can be led into the cold storage system 200 as first compressed air flow 102. For a relatively long time, preferably 50 to 100% is led into the cold storage system. Values outside this numerical range are generally reached only briefly during the change to normal operation C or to pure discharging operation B.

The means 201 for generating cold from compressed air and the means 203 for generating a compressed air flow can be formed by separate apparatus groups, as illustrated in FIG. 1. Preferably, however, one, several or all the parts of the apparatus of the means 201 for generating cold from compressed air are simultaneously a constituent part of the means 203 for generating a compressed air flow; these apparatus parts are then used both in the first and in the second operating mode. Therefore, the outlay on apparatus is reduced further.

Figure 2:
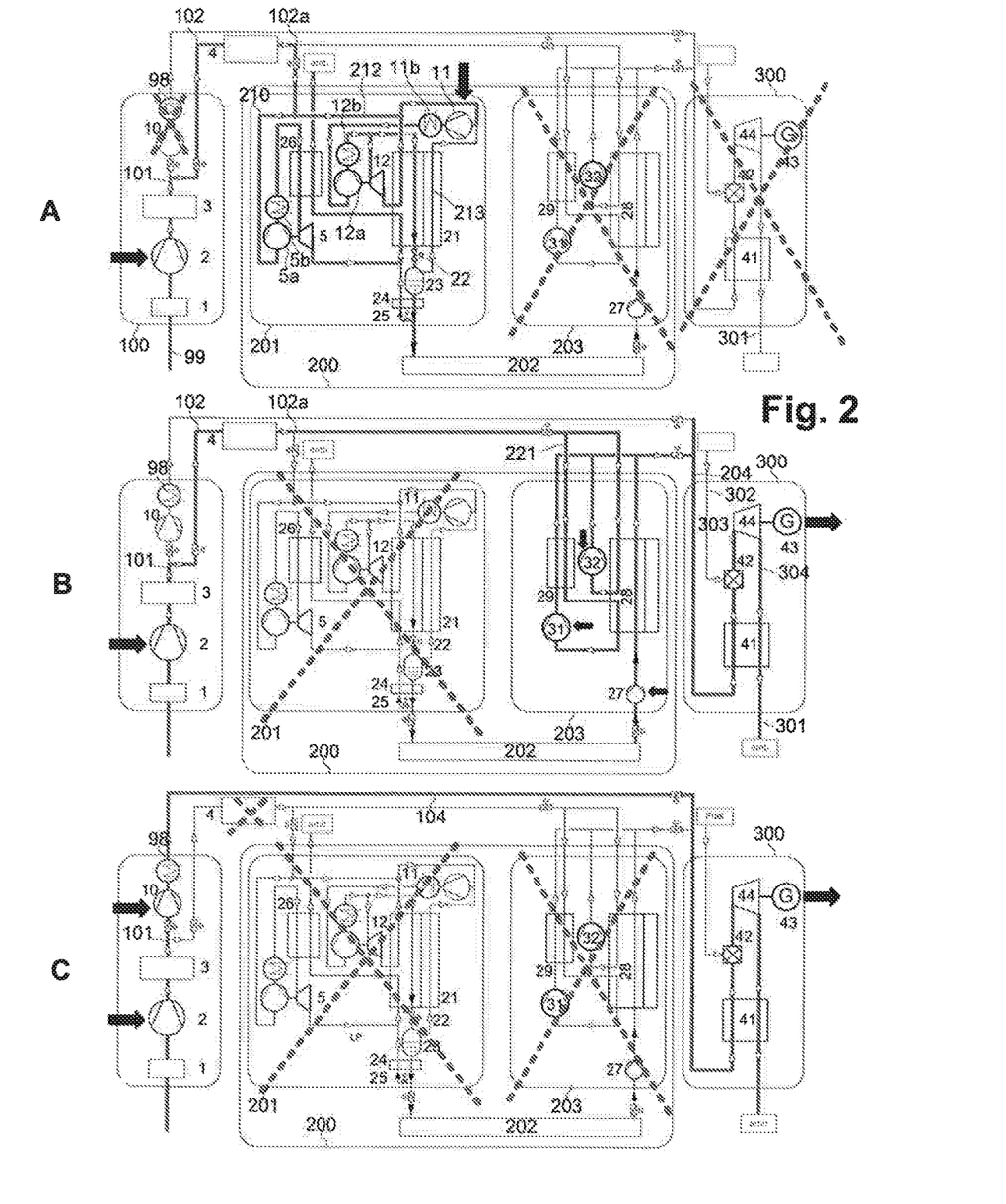
FIG. 2 shows a first exemplary embodiment of the invention, in which the cold storage system is constructed as an air liquefaction and evaporation system.

FIG. 2 shows a first exemplary embodiment of the invention, in which the cold storage system 200 is constructed as an air liquefaction and evaporation system. The operating cases A to C from FIG. 1 are illustrated; the operating cases A' and B' are of course likewise possible here. In addition, FIG. 2 is still schematic; however, substantially more details are illustrated than were left out from FIG. 1 or are shown in general terms. In FIG. 2, all the lines present are drawn in for all three operating cases illustrated; however, flow takes place only through those illustrated bold in each case, the remainder are non-operational in the respective operating case.

In addition to the air intake line 99 and the actual primary air compressor 2 for all of the air, the air compression system 100 has a filter 1, a pre-cooler 3 and re-cooler 98 for the booster 10. Primary air compressor 2 and booster 10 are each constructed with one stream. The primary air compressor 2 has three to four stages, the booster 10 has one to three stages. Incorporated in the line 102/102a for the "first compressed air flow" is a purification device 4, which in particular removes water and carbon dioxide before this air flow enters the cold part of the cold storage system 200. These parts of the plant, and also the elements of the cold storage system described below, are constructed in the exemplary embodiment in the way which is usual in air liquefaction technology and in cryogenic air fractionation systems.

In the exemplary embodiment of FIG. 2, the "means for generating cold from compressed air" are constructed as air liquefier 201, the "means for storing cold generated in the process" are constructed as liquid air tank 202, and the "means for generating a compressed air flow at the second pressure level" as air evaporator 203. In the example of FIG. 2, air liquefier 201 and air evaporator 203 are completely separate.

In the first operating mode A (pure charging operation), once more only the cold reservoir 202 is charged and only the air liquefier 201 is operational. The primary compressed air flow 101 is here fed completely to the air liquefier 201 through the cleaning device 4 and via line 102a as first compressed air flow 102.

A first part 210 (which can simultaneously form the "first partial flow" and the "second partial flow" in the sense of the patent claims) is boosted in a second booster 5a with re-cooler 5b to a pressure of 6 to 10 bar, is cooled down in a secondary heat exchanger 26 and expanded to slightly above atmospheric pressure in a first air turbine 5, producing work. The first air turbine 5 is coupled mechanically to the second booster 5a. The air that is expanded, producing work, is heated up in the cold part of a primary heat exchanger 21 and further in the secondary heat exchanger 26 to about ambient temperature and is finally blown off into the atmosphere via line 211 or used for drying purposes.

The remainder 212 of the purified first compressed air flow 102a is further compressed to a still higher third pressure level of 30 to 60 bar in a recycle compressor 11 driven externally by an electric motor and having a re-cooler 11b and in a third booster 12a having a re-cooler 12b and, finally, a first part of said remainder is expanded to the second pressure level, producing work, in a second air turbine 12, which drives the third booster 12a, heated up again in the primary heat exchanger 21 and fed back to the inlet of the recycle compressor 11. The remainder of the compressed air at the third pressure level is cooled down in the primary heat exchanger 21 and pseudo-liquefied, expanded to the second pressure level in a first throttling valve 22 and led into a separator (phase separator) 23. The liquid air from the separator 23 is cooled down further in a subcooler 24 and for the most part led into the liquid air tank 202 which, in this exemplary embodiment, is under positive pressure (second pressure level). Flash gas 213 from the separator 23 is heated up in the primary heat exchanger 21 to about ambient temperature and fed back to the inlet of the recycle compressor 11. A small part of the subcooled liquid air is expanded further to about atmospheric pressure in a second throttling valve 25, heated up in the supercooler 24 and mixed with the waste gas from the first air turbine 5.

In the second operating mode B (pure discharging operation), the power plant 300 and the air evaporator 203 are, the power plant obtaining its combustion air exclusively from the air evaporator. The primary compressed air flow 101 here is fed completely to the air evaporator 203 through the cleaning device 4 and via line 102a as first compressed air flow 102, and supplies the heat for the evaporation and heating of the stored liquid air and, in addition, itself forms part of the combustion air.

A first part of the purified first compressed air flow 102a is cooled down in a further secondary heat exchanger 29 and a further primary heat exchanger 28 without being liquefied, brought to the second pressure level in a first cold compressor 31, heated to ambient temperature again in the secondary heat exchanger 29 and fed into the combustion air line 204. A second part is cooled down in the primary heat exchanger 28 to an intermediate temperature (150 K in the example) and is brought to the second pressure level in a second cold compressor 32 and fed into the combustion air line 204.

Liquid air is taken from the liquid air tank 202, brought to the second pressure level in a pump 27 and fed to the evaporation and heating in the primary heat exchanger 28.

The power plant contains a combustion turbine, which comprises a combustion chamber (combustion unit) 42, an expander 44 for combustion gas 303 and a generator 43 for generating electrical energy, but no compressor for combustion air. Instead, all of the mechanical energy which is obtained in the expander 44 is transferred to the generator 43 via a mechanical coupling.

The combustion air 204 is heated up against expanded combustion gas 304 in a heater 41 and enters a combustion chamber (combustion unit) 42, in which a fuel 302, which in particular is formed by natural gas, is burned. The hot combustion gas 303 is expanded to approximately atmospheric pressure in the combustion turbine, producing work. Its waste heat is used in the heater 41; steam generation is not provided.

In the third operating mode C (normal operation—pure power plant operation), the cold storage system 200 is non-operational, the liquid air tank 202 of course continuing to fulfill its storage function. Here, the combustion air for the power plant 300 comes exclusively via the line 104 from the air compression system 100. There, the whole of the primary compressed flow 101 is boosted to the second pressure level in the first booster 10.

Of course, with the combined system illustrated in FIG. 2, the mixed operating modes A' and B' illustrated in FIG. 1 are also possible.

The energy flows into the combined system and out of the combined system are indicated with the arrows illustrated in bold. In all three operating modes, the drive energy for the air compression system comes from outside. The primary air compressor 2 and the first booster 10 (and also the recycle compressor 11) can be driven in the same way or in different ways via a steam turbine, a gas turbine, an electric motor or another motor, for example a diesel engine.

In an operating mode with charging operation (A, A'), the two boosters 5a and 12a are driven by air turbines (i.e. indirectly from the primary air compressor 2 and the drive of the latter), therefore need no additional energy import. However, further energy from outside must be put into the recycle compressor 11.

The discharging operation (B, B') is used regularly when the price of power is increased. At first glance, it appears to be absurd to use three machines 27, 31, 32, which are driven with external energy, for this purpose. However, these machines are all operated in the cold. The flows of which the pressure is increased have a substantially lower volume than in the warm. Therefore, only a very low amount of energy is imported here, as is indicated in FIG. 2 by the correspondingly smaller arrows.

During discharging operation and during normal operation, energy is exported in the form of electrical energy obtained in the generator, that is to say the actual end product of the combined system for generating electrical energy.

In FIG. 2, the pairs 12/26 and 28/29 comprising secondary heat exchanger and primary heat exchanger are each implemented by a pair of separate plate heat exchanger blocks. The two pairs can each be implemented by an integrated primary heat exchanger which combines both functions.

Figure 3:
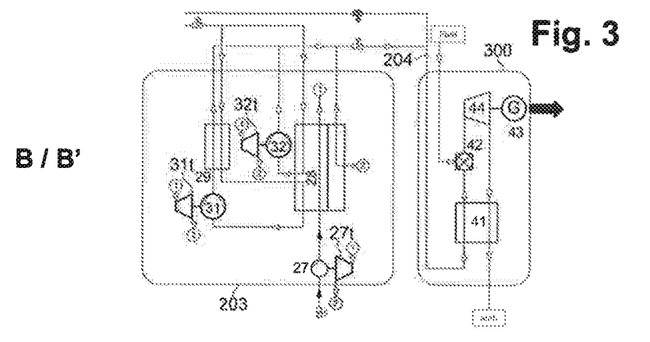
FIGS. 3 to 5 show three alternative embodiments of an air evaporator for use in a system according to FIG. 2, FIGS. 6 to 12 show further exemplary embodiments having different cold storage systems.
Figure 4:
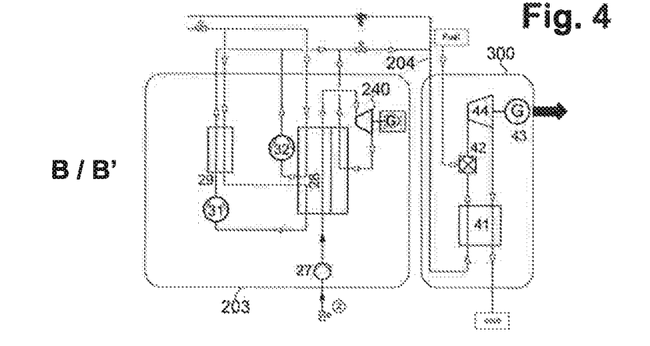
Figure 5:
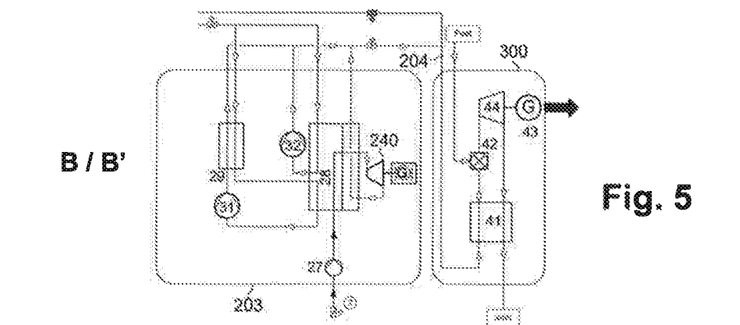

FIGS. 3 to 5 illustrate three further embodiments of an air evaporator which can respectively replace the air evaporator in FIG. 2.

FIG. 3 shows an embodiment of the air evaporator which manages without any external energy supply which goes beyond the primary air compressor. The cold machines 27, 31, 32 are respectively driven by an air turbine 27t, 31t and 32t.

To this end, the liquid air is brought in the pump 27 to a fourth pressure level, which is considerably higher than the second pressure level and, in this and the following exemplary embodiments, is 65 bar. The air at particularly high pressure generated in the process, following heating in the primary heat exchanger 28, is distributed to the three parallel-connected turbines 27t, 31t, 32t and is there expanded to the second pressure level, producing work. The air that is expanded, producing work, is combined again, heated in the primary heat exchanger 28 and finally fed into the combustion air line 204.

Of course, intermediate forms between the variants of the air evaporator of FIGS. 2 and 3 are also possible, in that, for example, only one or two of the cold machines 27, 31 and 32 of FIG. 2 are equipped with a turbine drive according to FIG. 3.

In FIG. 4, the liquid air is likewise brought to the aforementioned fourth pressure level in the pump. The air at particularly high pressure generated in the process, following heating to approximately ambient temperature in the primary heat exchanger 28, is expanded in the turbine 204 to the second pressure level, producing work. The air that is expanded, producing work, is heated in the primary heat exchanger 28 and finally fed into the combustion air line 204.

In FIG. 4, the air turbine 204 is coupled to a generator which, in the second operating mode (discharging operation), supplies additional electrical energy. The cold machines 27, 31 and 32 consume energy, in a way analogous to FIG. 2.

FIG. 5 corresponds largely to FIG. 4 but the air at the fourth pressure level, before the work-producing expansion 240, is heated only to an intermediate temperature of 140 to 290 K, preferably 200 to 290 K. The air turbine 240 therefore has a lower inlet temperature (and also a lower outlet temperature) than in FIG. 4.

Alternatively, in the invention it is also possible to use as cold storage system a system in which air liquefaction and air evaporation are at least to some extent carried out in the same apparatus. Such a system is described, for example, in the earlier patent application EP 12004833.5 and the patent applications corresponding thereto.

Figure 6:
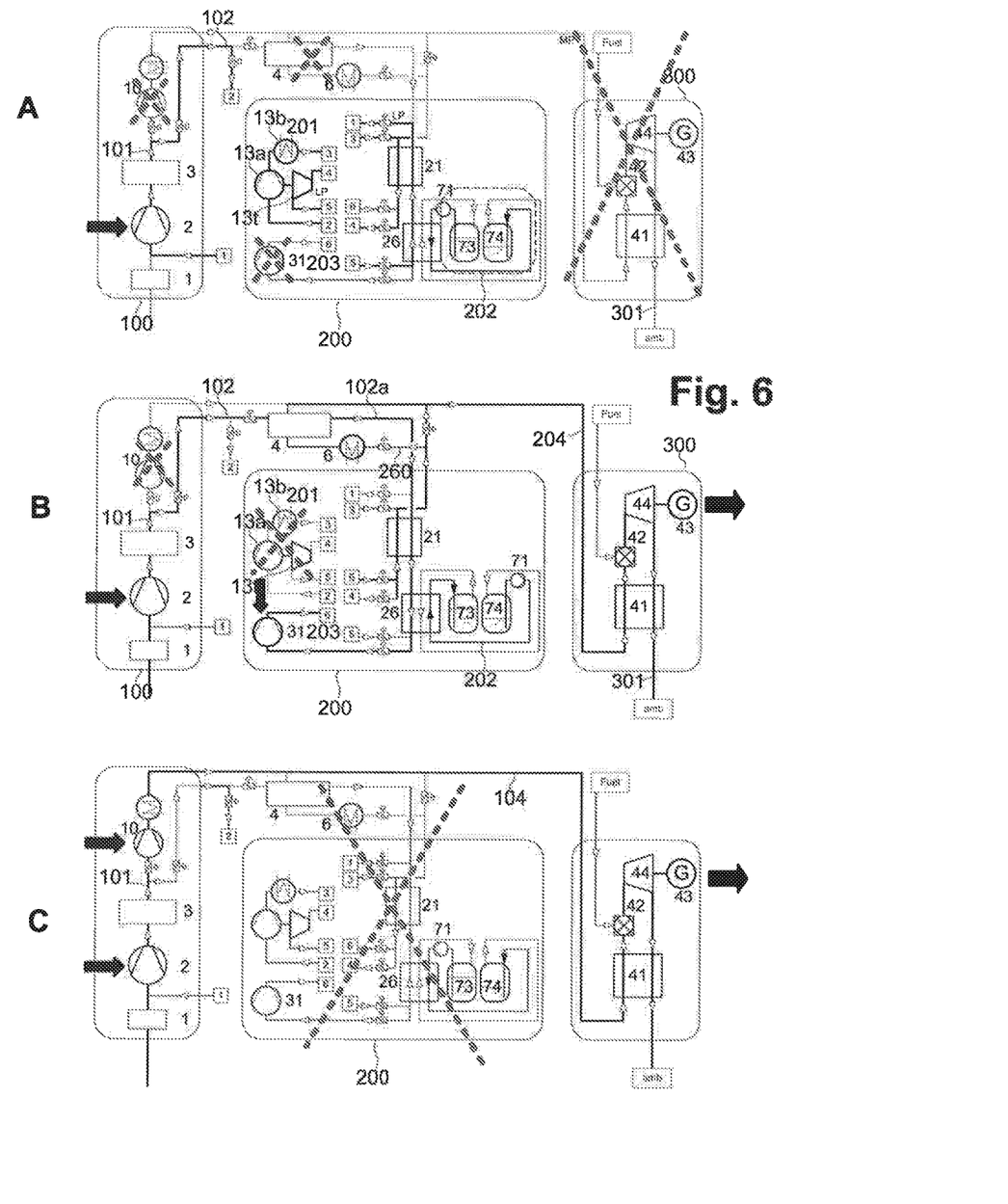

In the exemplary embodiment of FIG. 6, in the first operating mode (A) part of the "first compressed air flow" 102 is produced in the cold storage system in a way similar to that in FIGS. 2 to 5, by means of work-producing expansion. In this example, it is possible to dispense with purification (drying) of the first compressed air flow in the first operating mode.

The "means 201 for generating cold from compressed air" have an air turbine 13*t* and a booster 13*a* with re-cooler 13*b*. The "means 203 for generating a compressed air flow at the second pressure level" include an externally driven booster 31. A warm heat exchanger 21 and a cold heat exchanger 26 are a constituent part of both "means" 201, 203. The cold reservoir 202 is not constructed as a liquid air tank, as opposed to FIGS. 2 to 5, but as a pair of liquid tanks 73/74 for storing a liquid storage fluid at two different temperature levels T1 and T2, with T2>T1.

In the first operating mode (A), storage fluid from the warns tank 73 is cooled down to about T1 and led into the cold tank 74. In the example, liquid propane is used as storage fluid, T1 is approximately 90 K, T2 approximately 150 K. The (sensible) cold needed for this purpose is generated in the air turbine 13*t*. The first compressed air flow 102 is firstly boosted from the second to the third pressure level in the booster 13*a* with re-cooler 13*b*, then cooled down in the warm heat exchanger 21 to a temperature of 155 K, for example, and expanded to about atmospheric pressure in the air turbine 13*t*, producing work. The air enters the cold heat exchanger 26 at a temperature of about 85 K and there and further in the warm heat exchanger 21 is warmed to about ambient temperature. It can in the then be let off into the atmosphere or, as illustrated in FIG. 6, fed back to the inlet of the primary air compressor 2; in the extreme case, the air is merely circulated and the whole of the primary compressed air flow 101 is led into the cold storage system as first compressed air flow 102 (pure charging operation).

At the same time, in the first operating mode, storage fluid from the warm tank 73 is delivered by means of a pump 71 to the cold heat exchanger 26, cooled down there from about T2 to about T1 and finally led into the cold tank 74.

In the second operating mode (B—pure discharging operation), the whole of the primary compressed air flow 101, as first compressed air flow 102, is charged through the purification device 4 and enters the cold storage system as purified first compressed air flow 102*a*. There, it is cooled down in the two heat exchangers 21 and 26, brought to the second pressure level in a cold compressor 31, heated in the heat exchanger 21 and finally led into the combustion air line 204 as "third compressed air flow". A small part 206 can possibly take a diversion via a regeneration gas heater 6 and the purification device 4, where it is used as regeneration gas.

At the same time, in the second operating mode, storage fluid from the cold tank 74 is delivered by means of the pump 71 to the cold heat exchanger 26, heated there from about T1 to about T2 and finally led into the warm tank 73.

In the operating case B, the "third compressed air flow" forms the whole of the combustion air for the power plant 300.

The system of FIG. 6 can also be run in the modified first and second operating modes A' and B' from FIG. 1.

In the third operating mode C (normal operation—pure power plant operation), the cold storage system 200 is non-operational and the liquid level in the tanks 73, 74 remains constant. The combustion air for the power plant 300 here comes exclusively via the line 104 from the air compression system 100. There, the whole of the primary compression flow 101 is boosted to the second pressure level in the first booster 10.

Figure 7:
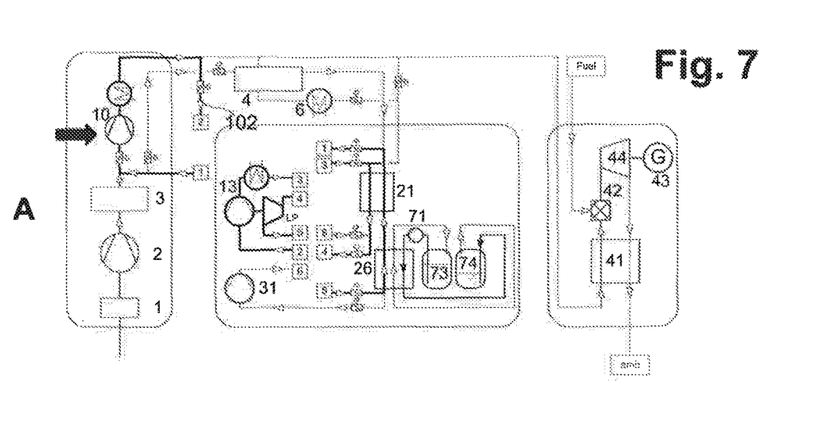

FIG. 7 shows a combined system, which deviates only slightly from that of FIG. 6. Here, only pure charging operation (A) is illustrated. Here, instead of the primary air compressor 2, the first booster 10 is used to generate the first compressed air flow 102. At the inlet to the first booster 10, atmospheric pressure prevails. Here, the cold reservoir is, so to speak, charged by the booster.

Figure 8:
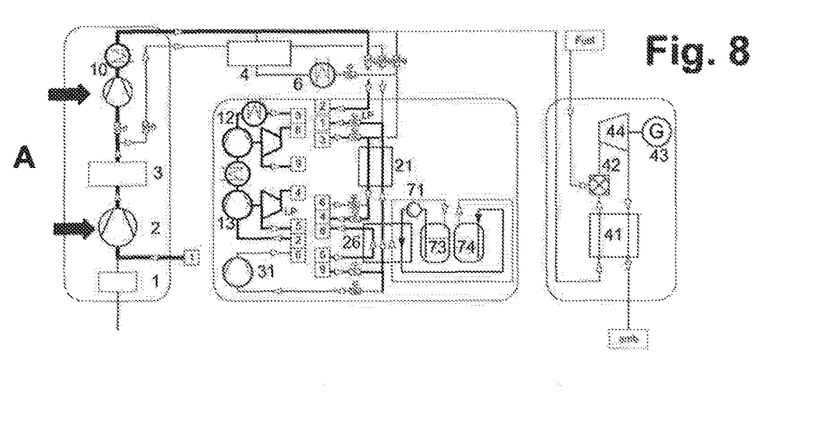

FIG. 8 likewise differs from FIGS. 6 and 7 only in the charging operation (A), specifically in that both the primary air compressor 2 and the first booster 10 are used to generate the first compressed air flow 102. Here, the cold circuit is operated from both compressors 2, 10. The turbines have the same inlet and outlet temperatures.

In addition, the "means 201 for generating cold from compressed air" have a second turbine-booster combination 12. This is connected in parallel on the turbine side and in series on the compressor side to the first turbine-booster combination 13.

Figure 9:
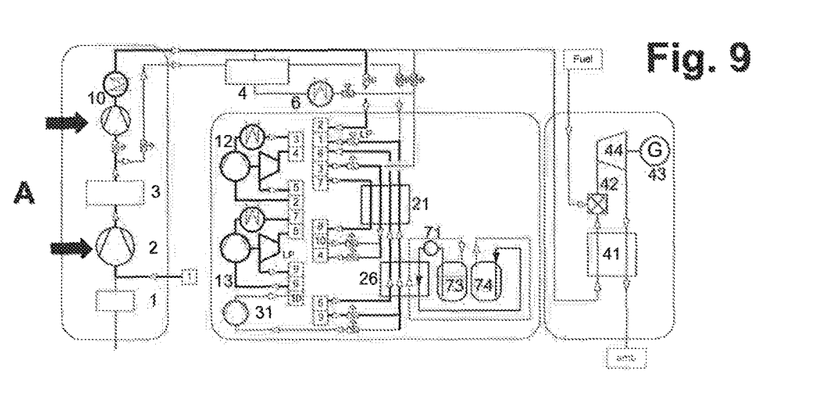

FIG. 9 differs from FIG. 8 in that the two turbine-booster combinations 12, 13 are also connected in parallel on the compressor side.

Figure 10:
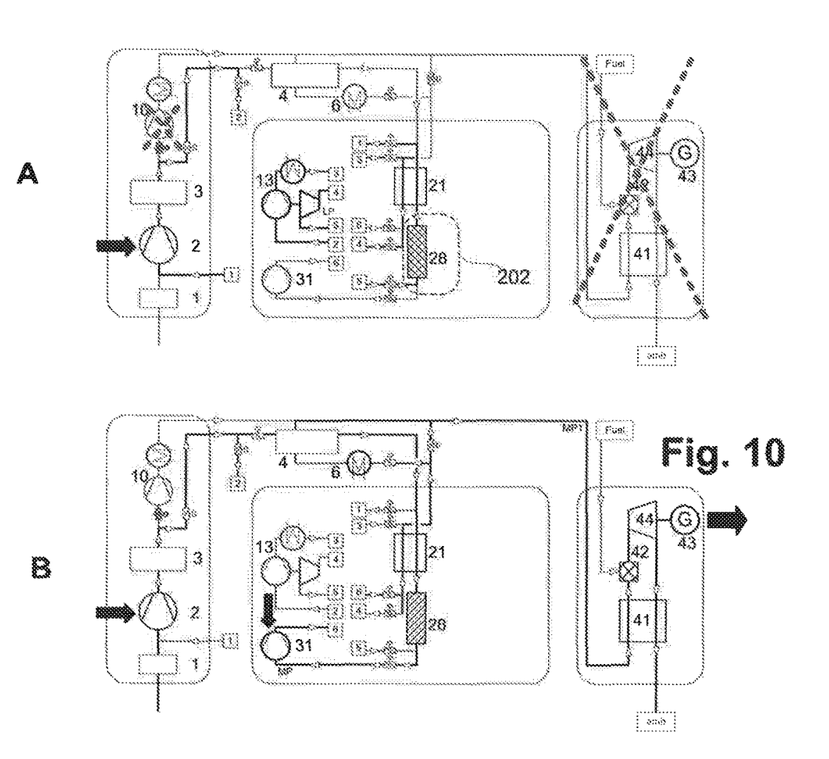

FIG. 10 corresponds largely to FIG. 6. However, the cold reservoir 200 is constructed as a regenerator cold reservoir. The storage mass of the regenerator 28 is cooled down in the first operating mode (A) and heated again in the second operating mode (B). Cold generation and generation of the third compressed air flow function in a way analogous to FIG. 6. Normal operation does not differ from FIG. 6(C).

In a way analogous to the compressor configuration in FIGS. 7, 8 and 9, the exemplary embodiment of FIG. 10 can also be modified in that, in the first operating mode, only the first booster 10 or both the primary air compressor and the booster 2 generate the "first compressed air flow", which is led into the cold storage system. If two turbine-booster combinations are used here, it is then also necessary to use two parallel-connected regenerators or one regenerator with two passages.

Figure 11:
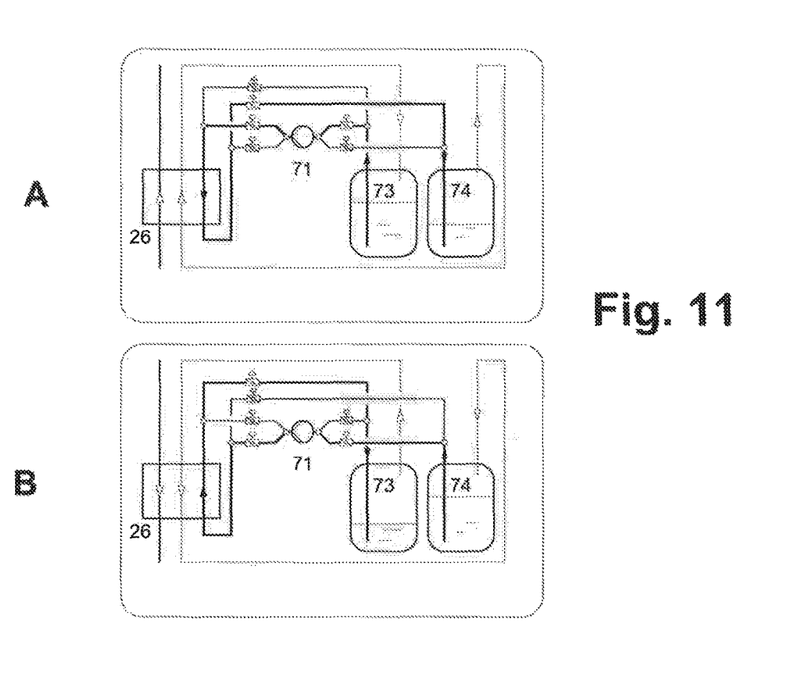

In FIG. 11, the cold reservoir 202 from FIGS. 6 to 9 is illustrated in detail, specifically in the first operating mode (A) (with feeding of cold air into the heat exchanger 26) and in the second operating mode (B) (with feeding of warm air into the heat exchanger 26). While the liquid from a container 73/74 is pumped around into the other 74/73, the vapor or the gas from the gas space above the liquid is led out of the receiver container 74/73 into the source container 73/74. The gas space of the two containers 73/74 can, for example, be filled with a non-condensing gas such as nitrogen.

Figure 12:
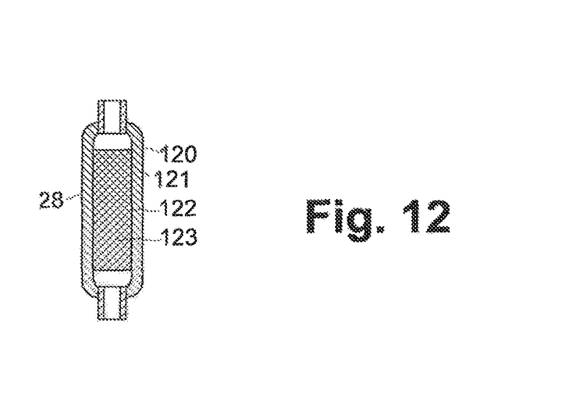

Further details of the regenerator 28 from FIG. 10 are shown in FIG. 12. It has an external container 120, thermal insulation 121 and an internal container 122, which is filled with a porous mass 123 that has a high thermal capacity.

In all the exemplary embodiments shown hitherto, it is possible to use one of the alternative embodiments of the power plant 300, as illustrated in FIGS. 13 to 18.

Figure 13:
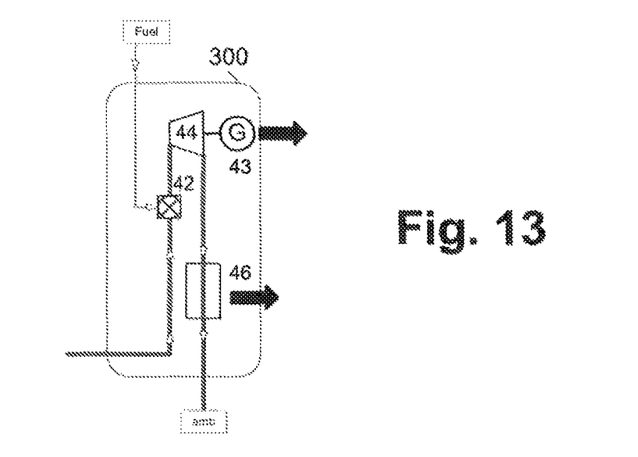
FIGS. 13 to 17 show three alternative embodiments of a power plant for use in each of the preceding exemplary embodiments.

In FIG. 13, the heat exchanger (recuperator) 41 from FIG. 2 is omitted and instead a steam generation system 46 is used (HRSG=heat recovery steam generator—sometimes also designated a waste heat boiler), in order to generate further electrical energy by means of a steam turbine.

Figure 14:
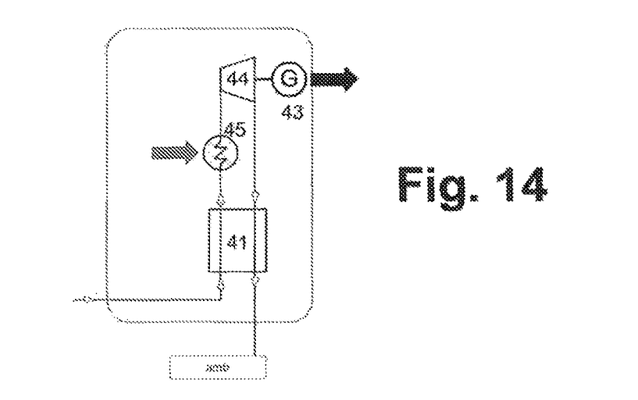

In FIG. 14, further heat is coupled into the combustion air via an additional heater 45. The source of this further heat can be any one desired, for example residual heat from another process, heat from a heat reservoir or from a solar system. As a result, with the same energy generation rate as compared with the power plant 300 of FIG. 2, fuel can be saved.

Figure 15:
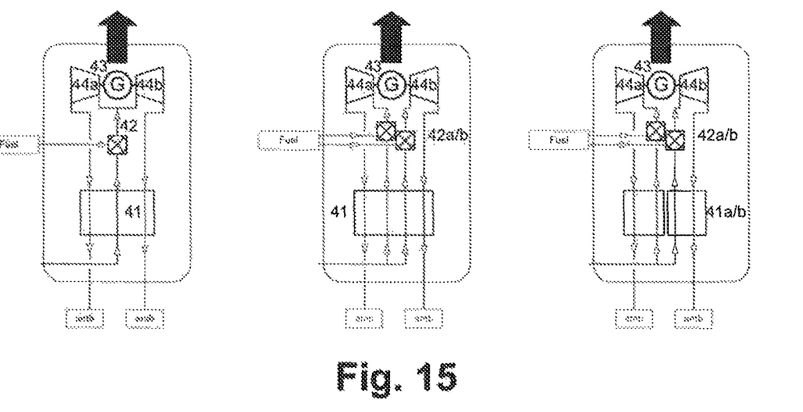

FIG. 15 shows three variants of a system having two combustion turbines 44a, 44b, which are both coupled to the generator 43.

Figure 16:
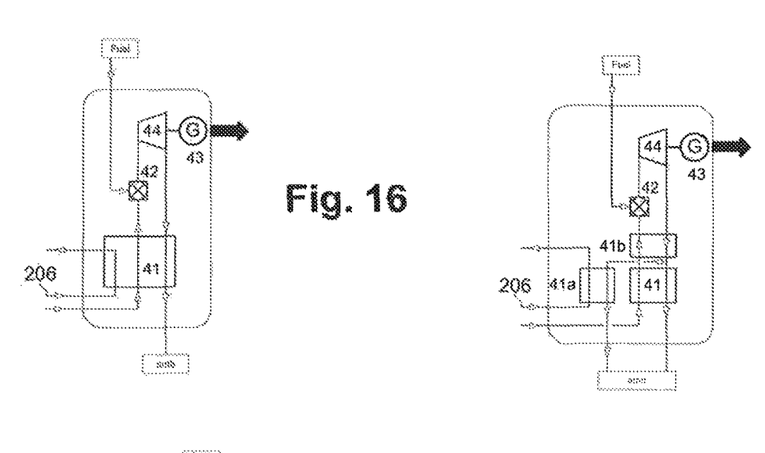

In FIG. 16, the recuperator 41 is used simultaneously for the heating of regeneration gas 206 for the purification device 4. Shown on the left is a variant with a combined heat exchanger 41, on the right another, in which only twin-flow high-temperature heat exchangers 41, 41a and 41b are used.

Figure 17:
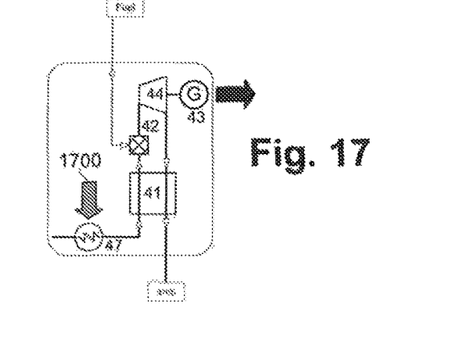

In addition it is possible, during the second operating mode (discharging operation), to couple compression heat 1700 from the primary air compressor into the combustion air via a further heater 47, as sketched in FIG. 17.

Figure 18:
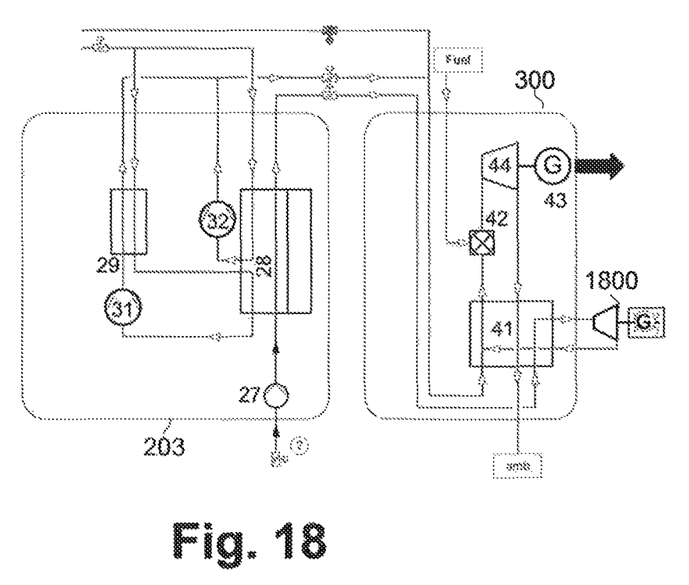
FIG. 18 shows an alternative embodiment of an air evaporator.

FIG. 18 shows a variant of the invention in the second operating mode, which can be applied to the systems in FIGS. 2 to 5. Here, the liquid air is brought to a fourth pressure level of 40 to 200 bar in the pump 27, heated to a temperature of, for example, 600° C. in the heater 41 by means of indirect heat exchange with combustion gas and, by means of work-producing expansion in a hot air turbine 1800, brought to the second pressure level of the combustion process, by which means additional electrical energy is generated.

The invention claimed is:

1. A method for generating electrical energy in a system comprising a power plant, a cold air storage system and an air compression system, wherein
    the air compression system includes a primary air compressor for generating a primary compressed air flow at a first pressure level,
    the power plant includes a combustion unit for generating a combustion gas for use in generating electrical energy, and
    the cold air storage system includes a means for generating cold air from the primary compressed air flow, a means for storing the cold air produced by the means for generating cold air and a means for generating a third compressed air flow at a second pressure level using the cold air from the means for storing the cold air, wherein the second pressure level is higher than the first pressure level,
the method comprising,
    operating in a first operating mode, comprising providing the primary compressed air flow as a first compressed air flow from the air compression system to the cold air storage system and charging the means for storing the cold air,
    operating in a second operating mode, comprising discharging the cold air from the means for storing the cold air to the means for generating the third compressed air flow; generating the third compressed air flow in the means for generating the third compressed air flow; and providing the third compressed air flow to the combustion unit, and
    operating in a third operating mode, comprising providing all of the primary compressed air flow as a second compressed air flow to the combustion unit,
the method further comprising
    operating the combustion unit at the second pressure level;
    when operating in the third operating mode, boosting all of the second compressed air flow to the second compressed air pressure level using a first booster included in the air compression system prior to the second compression air flow being provided to the combustion unit; and
    when operating in the second operating mode, providing a portion of the primary compressed air flow as the first compressed air flow to the cold air storage system for discharging to the means for generating the third compressed air flow and generating the third compressed air flow for use in the combustion unit; wherein the means for generating the third compressed air flow in the cold air storage system includes a cold compressor.

2. The method as claimed in claim 1, wherein in the second operating mode the first compressed air flow is only a first portion of the primary compressed air flow.

3. The method as claimed in claim 2, wherein, in the second operating mode a second portion of the primary compressed air flow is provided directly to the combustion unit.

4. The method as claimed in claim 1, further comprising expanding the combustion gas from the combustion unit in a combustion turbine to produce work and coupling the combustion turbine to a generator for generating electrical energy.

5. The method as claimed in claim 1, wherein the means for generating cold air comprises an air turbine mechanically coupled to a second booster and wherein when operating in the first operating mode, a first partial flow of the first compressed air flow is expanded in the air turbine to produce work, and a second partial flow of the first compressed air flow is boosted in the second booster.

6. The method as claimed in claim 1, wherein the means for storing the cold air includes a liquid air tank for cryogenic liquid air, and wherein when operating in the first operating mode, the first compressed air flow is liquefied in the means for generating cold air and is provided to the liquid air tank, and when operating in the second operating mode, the cryogenic liquid air is taken from the liquid air tank and, evaporated at above-atmospheric pressure in the means for generating the third compressed air flow.

7. The method as claimed in claim 6, wherein the means for generating the third compressed air flow includes an air turbine, and wherein in the second operating mode, at least part of the evaporated liquid air is expanded from a fourth pressure level to the second pressure level to produce work, and wherein the air turbine is coupled mechanically to an electric generator or to the cold compressor for increasing the pressure of the third compressed air flow.

8. The method as claimed in claim 1, wherein
when operating in the first operating mode, the first compressed air flow is cooled down and provided to the means for storing the cold air, and
when operating in the second operating mode, the first compressed air flow is removed from the means for storing the cold air and heated.

9. The method as claimed in claim 1, wherein the cold air storage system includes a regenerator, the method further comprising when operating in the first operating mode and in the second operating mode, passing at least part of the first compressed air flow through the regenerator.

10. A device for generating electrical energy comprising: a power plant, a cold air storage system and an air compression system, wherein
the air compression system includes a primary air compressor for generating a primary compressed air flow at a first pressure level,
the power plant includes a combustion unit for generating a combustion gas, and means for generating electrical energy from the combustion gas,
the cold air storage system includes a means for generating cold air from the primary compressed air flow, a means for storing the cold air produced by the means for generating cold air and a means for generating a third compressed air flow at a second pressure level using cold air from the means for storing the cold air, wherein the second pressure level is higher than the first pressure level, and wherein
the device includes a control means, that directs the device to operate
in a first operating mode, wherein the primary compressed air flow is provided as a first compressed air flow from the air compression system to the cold air storage system to charge the means for storing the cold air,
in a second operating mode, wherein the means for storing the cold air is discharged to the means for generating the third compressed air flow, and the third compressed air flow is provided to the combustion unit, and
in a third operating mode, wherein all of the primary compressed air flow is provided as a second compressed air flow to the combustion unit;
the device further comprising
a first booster included in the air compression system for boosting the second compressed air flow to the second pressure level;
wherein
the control means further directs the device to operate
the combustion unit at the second pressure level,
in the third operating mode such that all of the second compressed air flow is boosted by the first booster prior to being provided to the combustion unit,
in the second operating mode such that the first compressed air flow is comprised of a portion of the primary compressed air flow, and
wherein
the means for generating the third compressed air flow includes a cold compressor.

* * * * *